Oct. 23, 1962   J. F. CAMPBELL   3,059,416
FLUID DRIVE AND BRAKE SYSTEM
Filed July 2, 1959   8 Sheets-Sheet 1

INVENTOR.
JOHN F. CAMPBELL
BY
Oberlin, Maky & Donnelly
ATTORNEYS

Oct. 23, 1962    J. F. CAMPBELL    3,059,416
FLUID DRIVE AND BRAKE SYSTEM
Filed July 2, 1959    8 Sheets-Sheet 2

INVENTOR.
JOHN F. CAMPBELL
BY
Oberlin, Mahy & Donnelly
ATTORNEYS

Oct. 23, 1962  J. F. CAMPBELL  3,059,416
FLUID DRIVE AND BRAKE SYSTEM
Filed July 2, 1959  8 Sheets-Sheet 4

INVENTOR.
JOHN F. CAMPBELL
BY
Oberlin, Maky & Donnelly
ATTORNEYS

Oct. 23, 1962 J. F. CAMPBELL 3,059,416
FLUID DRIVE AND BRAKE SYSTEM
Filed July 2, 1959 8 Sheets-Sheet 6

SPECIFIC FUEL CONSUMPTION AT VARIOUS RPM AND BHP FOR A TYPICAL FOUR CYCLE, SPARK IGNITION, GASOLINE FUELED ENGINE, RATED TO DEVELOP 182 BHP AT 4400 RPM.

A INVENTION HYDRAULIC DRIVE SYSTEM
B STD. TRANSMISSION WITH OVERDRIVE
C STD. TRANSMISSION

INVENTOR.
JOHN F. CAMPBELL
BY
Oberlin, Maky & Donnelly
ATTORNEYS

Oct. 23, 1962 J. F. CAMPBELL 3,059,416
FLUID DRIVE AND BRAKE SYSTEM
Filed July 2, 1959 8 Sheets-Sheet 7

INVENTOR.
JOHN F. CAMPBELL
BY
Oberlin, Maky & Donnelly
ATTORNEYS

Oct. 23, 1962   J. F. CAMPBELL   3,059,416
FLUID DRIVE AND BRAKE SYSTEM
Filed July 2, 1959   8 Sheets-Sheet 8

FIG. 27 — GAS TURBINE PERFORMANCE CHARACTERISTICS

FIG. 28

INVENTOR.
JOHN F. CAMPBELL
BY
Oberlin, Maky & Donnelly
ATTORNEYS

United States Patent Office 3,059,416
Patented Oct. 23, 1962

3,059,416
FLUID DRIVE AND BRAKE SYSTEM
John F. Campbell, Beech Knoll, Timberidge Trail,
Gates Mills, Ohio
Filed July 2, 1959, Ser. No. 824,506
12 Claims. (Cl. 60—19)

The present invention relates generally as indicated to a fluid drive and brake system and more particularly as applied to power transmission and braking in motor vehicles such as passenger cars, trucks, buses, etc., for example, to an all-fluid system characterized in that the conventional transmission, differential, live axle, and the separate hydraulic brake system, with its master cylinder, wheel cylinders, brake shoes and brake drums, are not required. In essence, the present invention relates to a fluid power transmission system in which the prime mover, be it an internal combustion engine, a diesel engine, a steam or gas turbine, a dynamoelectric machine, or the like, drives a fluid pump assembly and, in turn, the pump assembly drives a fluid motor system which, in the case of a motor vehicle, comprises rotary fluid motors mounted in the rear wheels, or in the front wheels, or preferably in all the wheels.

Numerous attempts have been made heretofore to provide such hydraulic power transmission wherein an engine-driven pump supplies wheel mounted motors, but to my knowledge, these all have had the serious shortcoming of either lack of proper control of capacity or speed, or of poor overall operating efficiency owing to a variety of different reasons such as hydraulic slip, restriction of the pump inlet to achieve control, changing of engine load by changing of power absorbed by the pump, lack of relation of pump capacity to the variables attuned to efficient engine operation, lack of coordination of engine r.p.m. and carburetor throttle position or manifold pressure for efficient engine operation, etc.

It is accordingly a principal object of this invention to provide such fluid drive and brake system which comprises an engine-driven variable delivery positive displacement pump and fluid motors driven by the pump, the pump being provided with control means effective to provide for efficient operation of the engine under all conditions of engine speed and load.

It is another object of this invention to provide a fluid drive and brake system for a motor vehicle which is controlled by a single pedal or lever to achieve efficient engine operation at all speeds and loads and to brake the vehicle.

Other objects of the present invention, as applied to power transmission in motor vehicles are as follows, these other objects being enumerated without regard to their relative importance and without intending the same to be inclusive of all features and advantages of the present invention:

(1) Effect greatly reduced engine fuel consumption by automatically selecting the most efficient engine operating range in relation to varying load and speed conditions;

(2) Provide greatly increased torque for acceleration through a pedal or lever control which is arranged to permit selection and/or modulation to any torque value in the range from engine-idling speed to full throttle rated speed at any vehicle road speed, thereby greatly improving the overall performance even with much lower powered vehicles than are in current use;

(3) Provide uniformly modulated and positive braking at each wheel which is uneffected by moisture, dirt, and heat, and which does not require servicing or adjustment;

(4) Provide equal driving torque at each wheel regardless of wheel spin, as results from slippery pavement, thereby obtaining increased vehicle pulling power;

(5) Permit the engine to be more favorably located in the vehicle and enable improved and simplified body design by reason of the elimination of the currently used torque convertor, or clutch and gear box transmission, universal joints, drive shaft, differential live axles, and the friction braking system;

(6) Improved vehicle riding qualities by substantial reduction of the weights of the wheel assemblies, by omitting the drive shaft, differential, and live axles, and by using simpler and lighter suspension struts for the wheels as compared with existing suspension struts;

(7) Effect substantially reduced engine wear because of the fewer engine revolutions per mile achieved with the present invention;

(8) Provide a fluid braking system in which braking effort is derived from a unit that is located remotely from the wheels, and therefore, the heat generated, as by quick stops, may be readily dissipated by a similarly remotely located heat exchanger;

(9) Provide for acceleration of the vehicle without hesitation, interruption, or surge through uniform increase in driving fluid pressure;

(10) Provide for braking, free wheeling, and speed variations by the modulated movement of a single pedal or lever, thus, permitting quicker emergency stops by eliminating the time required now for the operator to remove his foot from the accelerator pedal and to place it on the brake pedal and;

(11) Silent operation of the vehicle due to lower pitch and lower noise level of the engine at the reduced speed operation thereof which is made possible with the present invention.

Other objects and advantages of the present invention will become apparent as the following description proceeds.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIGS. 24 to 26 are further curves with engine r.p.m. plotted against pressure p.s.i. (FIG. 24) and pressure p.s.i. plotted against manifold vacuum in inches mercury (FIGS. 25 and 26);

I. THE FLUID DRIVE AND BRAKE SYSTEM AS A WHOLE (FIGS. 1 AND 2)

Figure 1:
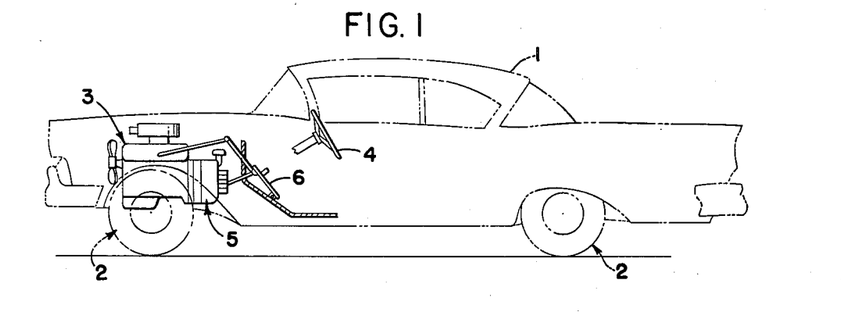
FIG. 1 is a side elevation view of my power transmission system as used in a passenger car.

Referring to FIG. 1 there is shown therein in dot-dash lines a typical passenger car 1 with which the present invention may be used to drive and to brake the four wheels 2, said car being powdered as by a spark-ignition, four cycle engine 3 and being steered as by a steering wheel 4. Operatively connected between the engine 3 and fluid motors (not shown in FIG. 1) mounted in the wheels 2 is the hydraulic unit 5 which transmits engine power to the wheels and which is controlled as by the foot-operated pedal 6 in the car 1. The pedal 6, as later described, also serves as the brake pedal to effect braking of the wheels 2. Although the unit 5 is herein shown mounted on the rear end of the engine block it may be mounted at any convenient place for driving by the engine crankshaft. Because the engine power is transmitted to the wheels 2 by way of fluid lines there is no need for the usual differential and live axles, nor for the universal joints and conventional drive shaft. Thus, substantial economies in cost and weight are effected and the floor of the passenger compartment need not have the usual longitudinal tunnel.

Figure 2:
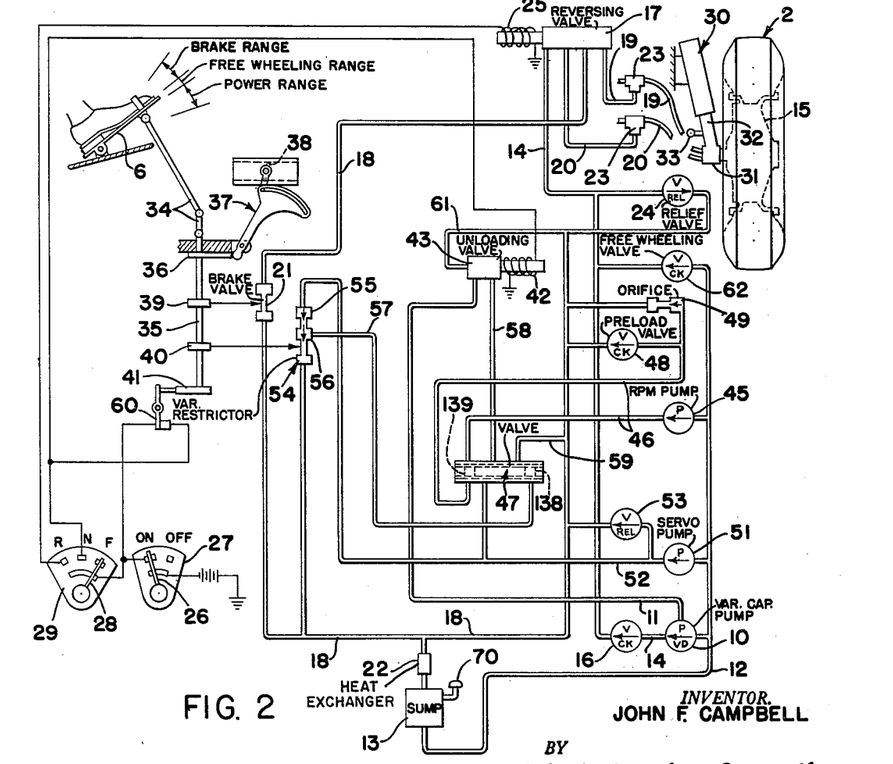
FIG. 2 is a schematic piping and wiring diagram of one form of the present fluid drive and braking system, showing the control pedal and one of the wheels which is provided with a fluid motor through which the wheel is driven or braked by manipulation of the control pedal.

Referring to FIG. 2, one of the main elements of the present system, i.e. the hydraulic unit 5, the wheel motors, and the control elements for the engine 3 and unit 5 is the engine-driven variable delivery positive displacement pump 10, the capacity of which may be varied from zero to maximum in accordance with the fluid pressure in the pump control line 11 leading thereto. The pump inlet line 12 communicates with a vented sump 13 and the pump output line 14 leads to the respective motors 15 mounted in the vehicle wheels 2 by way of a check valve 16, a forward and reverse control valve 17, and either line 19 or 20 depending on whether the wheel motors 15 are to be driven to propel the vehicle 1 in a forward or a backward direction. The other of said lines 19 and 20 is the return line through which the spent fluid is returned to the sump 13 through valve 17, return line 18, brake valve 21, and heat exchanger 22. T's 23 or the like may be provided so that the front wheels may be operated by one pair of lines 19 and 20 and so that the rear wheels may be similarly connected with another pair of lines 19 and 20 (not shown in FIG. 2). As is later described, the delivery capacity of pump 10 is preferably directly proportional to the fluid pressure in the line 11.

Downstream of the check valve 16 is a relief valve 24 which is normally closed and set to open only when the discharge pressure from the pump 10 is greater than the maximum operating pressure of the system. The forward and reverse control valve 17 is normally in the forward position when the solenoid 25 thereof is in deenergized condition. However, when the lever 26 of the ignition switch 27 is in the "On" position and the lever 28 of the direction switch 29 is turned to the "R" (reverse) position, the solenoid 25 will be energized to actuate the valve 17 so as to reverse it and thus the wheel motors 15 will be driven in reverse direction.

As shown in FIG. 2 each wheel 2 is mounted on a strut assembly 30 which allows the wheel shaft 31 to move up and down as the vehicle 1 travels on rough road. In the case of the front wheels 2, the mounting strut 32 may be rotated about its axis by a steering lever 33 adapted to be operatively connected to steering wheel 4 by conventional means. Thus, when the valve 17 is in forward "F" position, fluid under pressure will enter the fluid motor by way of the line 19 and the spent fluid will be returned to the sump 13 by way of the other line 20 and return line 18; and, of course, when the solenoid 25 of said valve 17 is energized, as aforesaid, fluid under pressure will be supplied to each motor 15 through the line 20 to cause the motor 15 to be driven in a backward or reverse direction, and again the spent fluid will be returned to the sump 13 by way of the other line 19 and return line 18.

Referring now to the control system, there is provided a pivotally mounted foot pedal 6 which, through linkage 34, actuates a cam shaft 35, the pedal 6 in FIG. 2 being shown in its intermediate "Free Wheeling Range." When it is desired to increase the engine r.p.m. and power output, the pedal 6 is depressed to the "Power Range" and when it is desired to brake the vehicle 1, the pedal 6 is swung upwardly to the "Brake Range." Operated by the cams 36 on the cam shaft 35 is the engine throttle control assembly 37 which, as hereinafter explained, opens the throttle valve 38 according to a predetermined schedule as the pedal 6 is depressed through the "Power Range." The second cam 39 operates the brake valve 21 when the pedal 6 is swung counterclockwise to the "Brake Range" position and, in essence, the brake valve 21 is a variable restrictor which progressively blocks the return of fluid from the wheel motors 15. Because the fluid is heated thereby, especially during quick stops, the heat exchanger 22 is provided ahead of the sump 13.

The third cam 40 on the cam shaft 35 controls operation of the pump 10 as is presently to be explained, and the fourth cam 41 controls energization and deenergization of the solenoid 42 of a pump unloading valve 43.

Also driven by the engine 3 is an r.p.m. pump 45 which has its intake port in communication with intake line 12 and which has its delivery port connected to output line 46 leading to a chamber at one end of valve 47 and from the chamber into a preload check valve 48 which has an orifice or restriction 49 associated therewith.

As later explained, the capacity of the pump 45, the size of the orifice 49, and the size of the seat, the contour of the valve member, and the preload and rate of deflection of a spring within the check valve 48 are so designed as to achieve the desired program of pressure in the chamber of valve 47 versus the movement of the pedal 6. This is represented by the curve 124 in FIG. 19. In essence, the pressure in the valve chamber aforesaid may be said to be an indication of the actual r.p.m. of the engine drive shaft while the pressure in another chamber at the other end of said valve 47 is an indication of the desired r.p.m. of the engine drive shaft.

The engine drive shaft also drives a servo pump 51 which has its intake and delivery ports connected to intake line 12 and delivery line 52, a relief valve 53 serving to establish a constant pressure fluid supply to the variable restrictor valve 54 which is operated by cam 40. When the actual r.p.m. of the engine drive shaft is greater than that desired, as established by the variable restrictor valve 54 and orifice 49, the pressure in chamber 139 will be greater than in the other chamber 138. The lower pressure leading into the right end of valve 47 through line 57 will render the predominant pressure in the left end through line 46 effective to cause the valve member in valve 47 to move in one direction so as to allow fluid to flow under pressure through the line 58 and the unloading valve 43 to the variable capacity pump line 11 from the servo pump output line 52. Accordingly, the amount of fluid pumped by the pump 10 will increase to thereby decrease the speed of the engine drive shaft.

Conversely, when the actual r.p.m. of the engine drive shaft is less than that desired as indicated by the setting of valve 54, the pressure in chamber 138 will build up whereby the then predominating pressure in the right chamber of valve 47 will cause the valve member to move in the opposite direction. This allows the fluid under pressure in the pump capacity control line 11 to be bled into the return branch 59 of the return line 18. The lowering of the pressure in the line 11 causes a decreased amount of fluid to be pumped by the pump 10 thereby increasing the r.p.m. of the drive shaft.

In general, the operator sets up the desired r.p.m. through the position of the foot pedal 6 while simultaneously valve 47 operates automatically to increase or decrease the torque on the engine drive shaft thereby making the actual r.p.m. agree with the desired r.p.m.

When the solenoid 42 of the unloading valve 43 is energized either by shifting the lever 28 of direction switch 29 to neutral position "N" or by shifting the pedal 6 to "Free Wheeling Range" with cam 41 closing switch 60, capacity control line 11 is vented through branch return 61 to return line 18 whereby pump 10 operates at zero capacity. Displacement of the fluid motors 15 is accommodated by the free-wheeling check valve 62 connected between intake line 12 and delivery line 14 which leads to forward and reverse control valve 17.

Having thus described the general structure and operation of the system herein, reference will be made under appropriate headings of the details of the several components of the system.

*Engine-Driven Pump Assembly (FIGS. 3, 4 and 5) And Components Thereof (FIGS. 6 to 18)*

Figure 3:
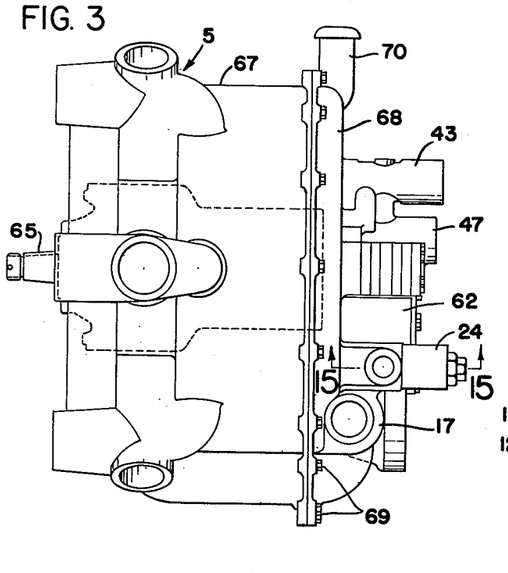
FIG. 3 is a side elevation view of the engine-driven pump assembly.
Figure 4:
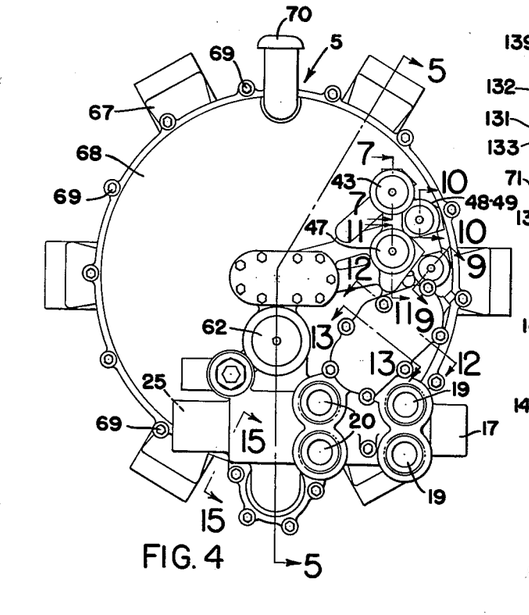
FIG. 4 is an end elevation view of the engine-driven pump assembly as viewed from the right-hand end of FIG. 3.
Figures 5, 6:
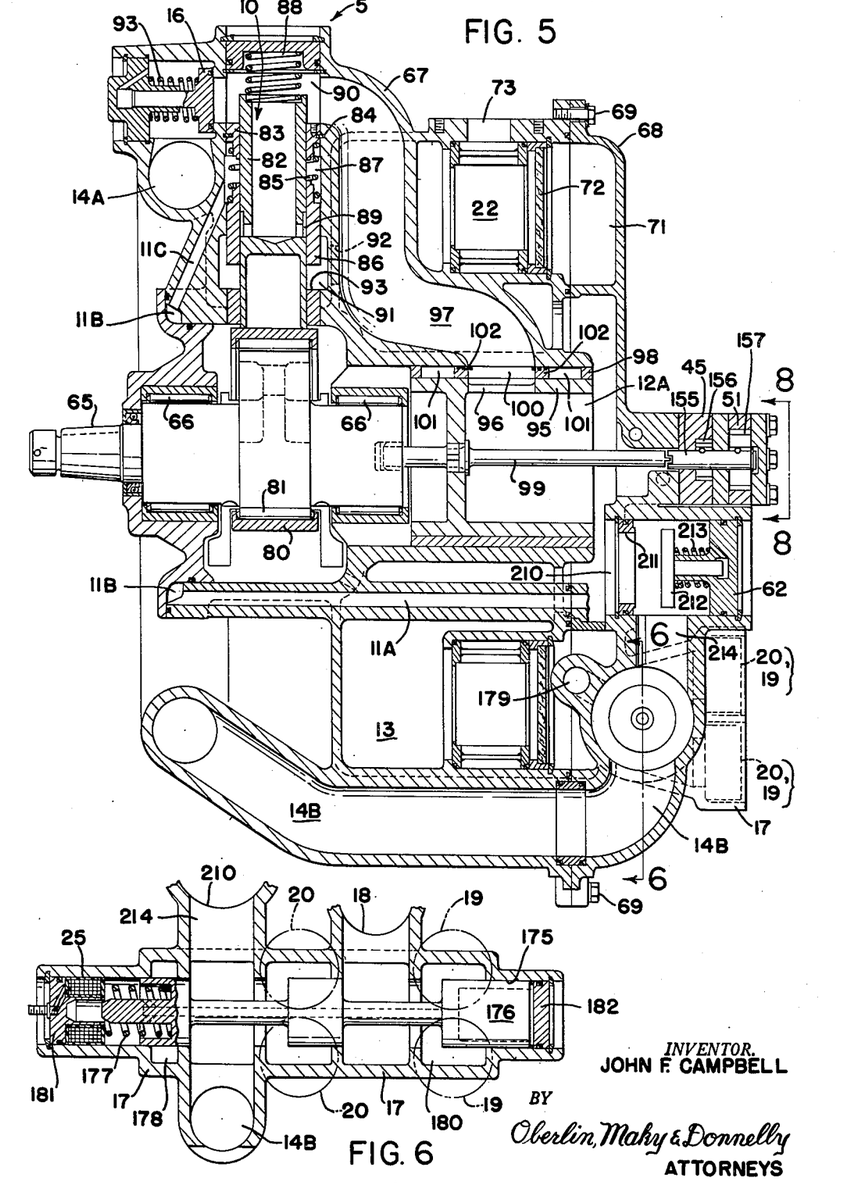
FIG. 5 is a cross-section view, on somewhat enlarged scale, taken substantially along the line 5—5, FIG. 4.
FIGS. 6 to 15 are detail cross-section views taken respectively along the lines 6—6, FIG. 5; 7—7, FIG. 4; 8—8, FIG. 5; and 9—9, 10—10, 11—11, 12—12, 13—13, 14—14, FIG. 4; and 15—15, FIG. 3.

As best shown in FIGS. 3, 4 and 5, the engine-driven pump assembly or hydraulic unit 5 has a shaft 65 journalled therein, as in needle bearings 66 or the like, and adapted to be coupled with the crank shaft of the engine 3 in the case of an internal combustion engine and, of course, with a comparable or equivalent output or drive shaft of an electric motor, gas turbine, diesel engine, etc. This unit 5 comprises a two-part housing including a main casting 67 and a cap part 68 secured together by screws 69, the cap part 68 being formed with a vented filler cap 70 leading into the hot oil gallery 71.

Figure 15:
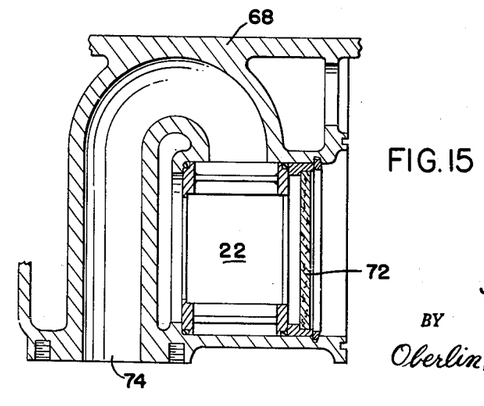

Formed in the hydraulic unit 5 is the sump 13 of annular form with fluid returned thereto through a filter 72 and heat exchanger 22 also preferably annular in form, and upstream of the filter 72 is a hot oil gallery 71 to which the spent fluid in heated condition, is returned for flow through the filter 72 and heat exchanger 22 into the sump. The heat exchanger 22 as best shown in FIGS. 5 and 15 may have cooling fluid circulated therethrough by way of the openings 73 and 74 formed in casting 67.

*The Variable Delivery Positive Displacement Pump 10 (FIG. 5) and Pump Inlet Valving (FIGS. 5 and 16 to 18)*

The aforesaid shaft 65 is the pump drive shaft which has an eccentric portion 80 journalled on a needle or like bearing 81 and which, when driven by the engine crankshaft, actuates a plurality of spring-biased radial plungers 82, herein six such plungers being employed. Each plunger 82 is guided for radial movement in a bushing 83 which preferably is shrunk fit in a radial bore in the housing part 67 and retained by snap ring 84. The bushing is helically grooved, as shown, to retain the tension spring 85. The plunger 82 is a slip fit in the bore of a capacity regulator sleeve 86 and the outside diameter of the sleeve is a slip fit in the radial bore of housing part 67. The capacity regulator sleeve 86 also is helically grooved to retain the other end of the tension spring 85.

In FIG. 5 the sleeve 86 is shown in a position for 50% pump delivery capacity by reason of fluid pressure in the chamber 87 acting on the radially outer end of sleeve 86, thereby elongating the tension spring 85 and urging the inner end of sleeve 86 to a position such that when the plunger 82 has moved in one-half of its stroke against eccentric 80 by biasing spring 88, the spill groove 89 thereof will be inward of the inner end of sleeve 86. Thus, during the first half of the outward pumping stroke of the plunger 82 the fluid in the chamber 90 will flow through the spill groove 89 into chamber 91 and thence through passage 92 into the sump 13. When the pressure in the chamber 87 and in the line 11 (passage 11A, manifold 11B, and passage 11C) leading thereto from solenoid valve 43 and passage 58 is at a high value, the sleeve 86 will contact the stop surface 93 and will thereby assume a position for 100% pump delivery capacity, that is, the spill groove 89 is within sleeve 86 during the entire outward pumping stroke of plunger 82. On the other hand, when the pressure in the chamber 87 and line 11 (11A, 11B, and 11C) is at a low value, the sleeve 86 will move in outward under the influence of the tension spring 85 so as to contact inner end of bushing 83 whereby it is then in the zero pump delivery capacity position with the spill groove 89 inward of the inner end of the sleeve 86 during the entire pumping stroke. Accordingly, the position of sleeve 86 and, therefore the pump 10 delivery capacity, is directly proportional to the pressure in the line 11 and chamber 87.

The volume of fluid pumped by each plunger 82 is a constant amount during each revolution of the drive shaft 65, however, the portion of the volume pumped through the delivery check valve 16 is dependent upon the position of the associated sleeve 86 and thus, on the pressure in the line 11. For example, with the sleeve in the 50% capacity position, as shown in FIG. 5, fluid in each plunger chamber 90 is in common communication with chamber 91 when the plunger 82 is at any position between the bottom end of its stroke and 50% of the maximum outward stroke, and thus the spill groove 89 will be uncovered and the fluid in the cavity 90 will pass freely into chamber 91 and thence through the passage 92 which leads into sump 13. This is true whenever spill groove 89 is uncovered by the inner end of sleeve 86 because the resistance through the above circuit to the sump 13 is much less than through the associated delivery check valve 16 which is always biased shut by the combination load of the spring 93 and the operating pressure in the delivery line 14 (manifold 14A and the pressure passages 14B leading to forward and reverse control valve 17). According to the above, it can be similarly reasoned that when the capacity sleeve 86 is in the outermost zero capacity position, that is, in contact with the end of bushing 83, the spill groove 89 will be uncovered throughout the entire stroke of the plunger 82 and, therefore, all the fluid which is displaced during the inward stroke will return to the sump 13. On the other hand, when the capacity sleeves 86 are in the 100% capacity position, that is, in contact with the stop surfaces 93, the spill grooves 89 thereof will be covered throughout the entire pumping strokes of the respective plungers 82 and, therefore, all of the fluid displaced by respective plungers 82 will pass through the respective check valves 16 and into the manifold 14A and thence through passage 14B to the forward and reverse control valve 17.

The pump inlet valve 95 is driven by the drive shaft 65 and as best shown in FIGS. 5 and 16 to 18 the inlet valve port 96 is open to the inlet passages 97 only during the suction strokes of the respective plungers 92. Fluid is supplied through the port 96 without restriction from line 12 (opening 12A in valve 95 which opens into sump 13).

Figure 16:
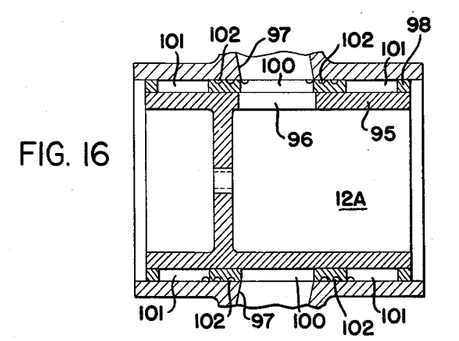
FIGS. 16 to 18 are detail cross-section and developed views of the preferred form of valving employed in connection with the pump of the engine-driven pump assembly.
Figures 17, 18:
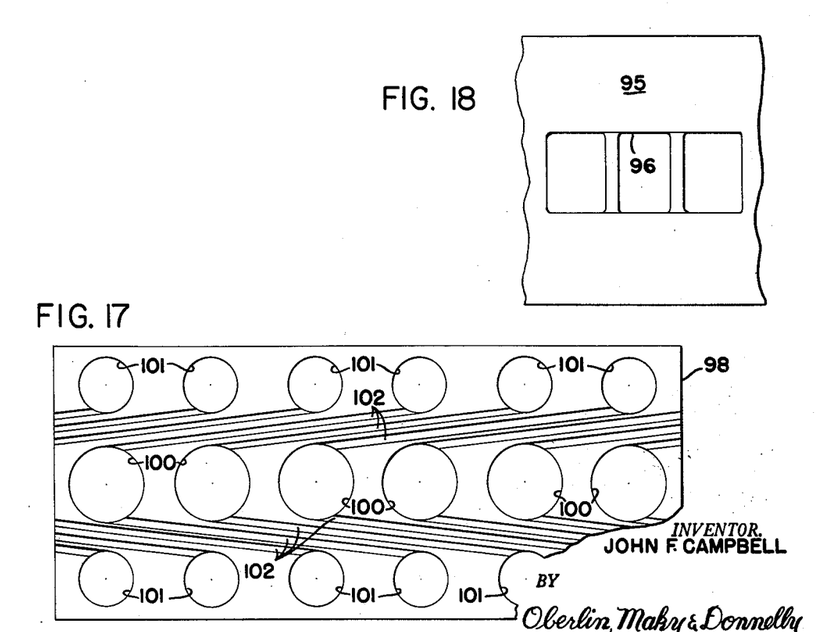

The pump inlet valve 95 as shown in detail in FIGS. 16 to 18 has the port 96 through the wall thereof and rotates in a sleeve 98 which may be shrunk fit in the housing part 67, said valve 95 being driven through the splined connection of the valve drive shaft 99 which, in turn, has a splined connection with the pump drive shaft 65. A development of the outside diameter of the sleeve 98 is shown in FIG. 17 and a development of the outside diameter of the valve 95 is shown in FIG. 18. Multiple passages 100 registering with pump intake passages 97 are connected to multiple static holes 101 by grooves 102 respectively. The grooves 102 connect passages 100 and holes 101, which are spaced 180° apart around from the passage. The area of each pair of holes 101 is equal to the area of the diametrically opposite passage 100. By reason of that construction, the hydraulic forces on the surface of the valve 95 are opposed by equal and opposite forces and therefore, are balanced out. This allows the valve 95 to rotate freely in the bore of the sleeve 98 regardless of the pressure in the ports 97 and in the passages 100. The chamber 12A in the valve 95 receives fluid from the sump 13 and this fluid is drawn through the port 96 and flows through the multiple passages 100 and related ports 97 to the respective pump chambers 90 as the valve 95 rotates to align the opening 96 with successive passages 100 of sleeve 98.

Figures 7, 8, 13, 14:
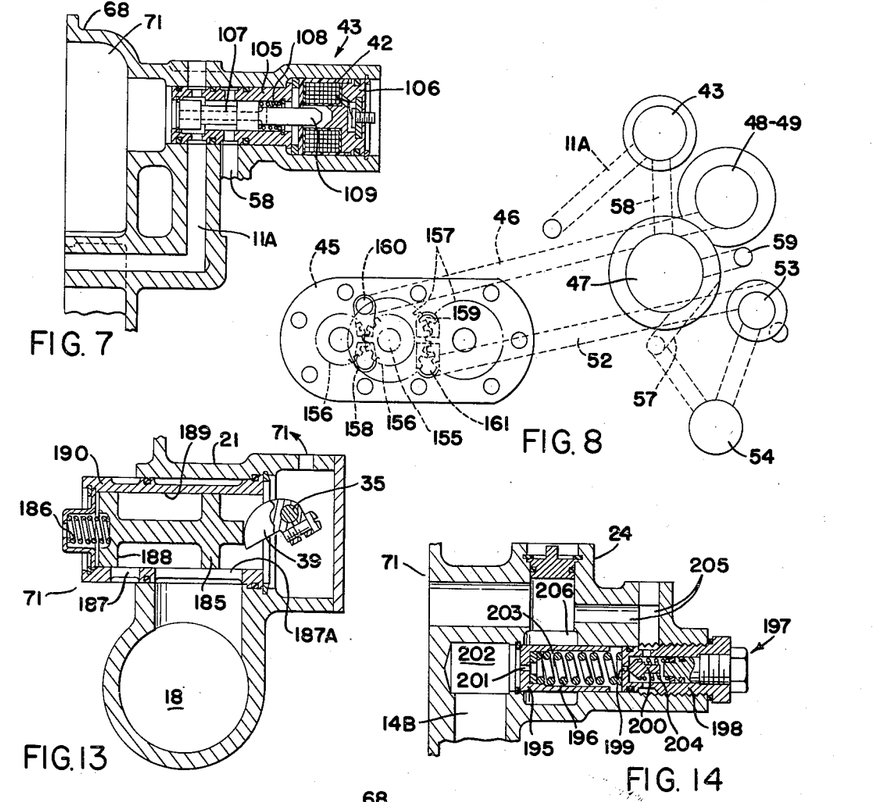

*The Solenoid Valve 43 (FIG. 7; Also FIGS. 2–5)*

This valve 43 is formed as a part of the housing member 68 including a ported sleeve 105 and solenoid 42 held therein as by means of snap rings as shown, the sleeve 105 and the solenoid retainer 106 being provided with suitable packing rings such as O-rings, to prevent leakage. The ported sleeve 105 is intersected by a pair of passages 58 and 11A, of which the passage 11A, best shown in FIG. 5, extends through the housing part 67 to an annular manifold 11B, and thence through radiating passages 11C to the respective chambers 87 associated with capacity regulating sleeves 86, whereby such passages 11A, 11B, and 11C constitute the pump capacity control line 11 referred to in connection with FIG. 2. The other passage 58 communicates with a port of the valve 47 as shown in FIG. 2 and as shown in detail in FIG. 11.

Reciprocable in the ported sleeve 105 is the valve spool 107 which is biased to the position shown by the spring 108, the stem 109 of the valve spool extending into the solenoid 42 so as to constitute an armature which is pulled toward the right when the solenoid 42 is energized, as hereinafter explained. When the solenoid 42 is deenergized, fluid under pressure entering from passage 58 flows around the groove of the spool 107 to the passage 11A.

When the solenoid 42 is energized the valve spool 107 is pulled toward the right to block such flow of fluid from passage 58 to passage 11A and to open the passage 11A to the hot oil gallery 71 by way of the open end of the ported sleeve 105. The solenoid 42 is thus energized when the direction switch lever 28 (FIG. 2) is moved to the neutral "N" position and is also so energized when the pedal 6 is moved to "Brake Range" position or to "Free Wheeling Range," whereby the cam 41 on the cam shaft 35 closes the switch 60 which is in wired parallel with the aforesaid neutral "N" position of the direction switch 29.

Figure 10:
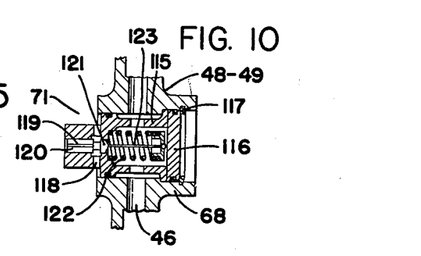

*The Check and Restrictor Valve 48—49 (FIG. 10; Also FIGS. 2, 4, and 8)*

Figure 11:
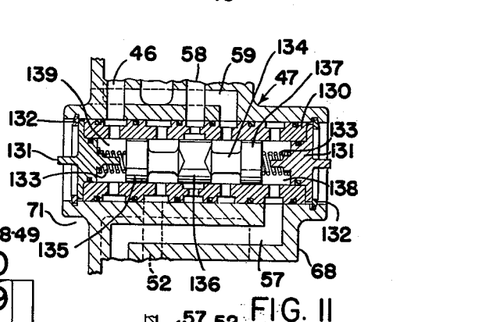

This valve is in the nature of a pressure regulating valve also formed in the housing part 68 and including a ported sleeve 115 held in place by a sealing plug 116 and snap ring 117 and provided with outlet ports 118 leading into the hot oil gallery 71 and an inlet 46 from r.p.m. pump 45 and valve 47 (FIGS. 2, 8, 10, and 11). The valve member 119 is provided with a guide stem 120 and a head 121 which has a clearance in sleeve 115 to form the orifice 49. The valve member 119 is biased by means of a spring 122 which, through a headed wire 123 secured to the valve member, normally tends to urge the latter to the position shown in FIG. 10. As the pressure in the passage 46 builds up the valve member 119 is urged to the left to bleed off an increasing volume of the fluid to the hot oil gallery 71 so as to maintain a prescribed pressure in the line 46 and in the chamber at the left end of valve 47 (FIG. 11). The capacity of r.p.m. pump 45, the size of the orifice 49, the size and contour of the valve head 121, and the preload and deflection rate of the spring 122 are selected to establish the program of pressure in line 46 versus movement of pedal 6 as represented by line 124 in FIG. 19.

*The Valve 47 (FIGS. 10, 11; Also FIGS. 2, 3, 4, and 8)*

This valve 47, as the others, is formed as a portion of the housing part 68 and has a ported sleeve 130 therein which is formed with openings in register with passage 46 from the r.p.m. pump 45, with passage 52 from the servo pump 51, with passage 58 to valve 43, with return branch 59 to the hot oil gallery 71, and with passage 57 to the variable restrictor 54.

The ported sleeve 130 is closed at its ends by the spring abutment members 131 that are held in place together with sleeve 130 as by means of snap rings 132. Centered in the ported sleeve 130 by springs 133 is the valve spool 134 provided with three lands 135, 136, 137 and a pair of intervening grooves. When the spool 134 is in its centered position as in FIG. 11, the passage 58 is blocked by the middle land 136. When the pressure in the passage 57 and chamber 138 acting on the right-hand end of the spool 134 is greater than the pressure in the passage 46 and chamber 139 acting on the left-hand end, the spool 134, the latter will be shifted toward the left to establish metered flow (by reason of the metering portions of the middle land 136) from passage 58 to passage 59 thereby bleeding the control line 11 (11A, 11B, and 11C). On the other hand, when the pressure in the chamber 139 acting on the left-hand end of the spool 134 is greater than the pressure in the chamber 138 acting on the right-hand end, the spool 134 will be shifted toward the right to establish metered flow from passage 52 to passage 58 to build up a desired control pressure in line 11.

The operation of this valve 47 in establishing the pressure differentials aforesaid in chambers 138 and 139 at the opposite ends of the spool 134 is controlled by the cam actuated regulating valve or variable restrictor 54, which is next to be described, and by the valve 48.

Figure 12:
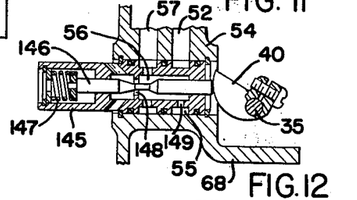

*The Cam Actuated Regulating Valve 54 (FIG. 12; Also FIGS. 2 and 8)*

This valve comprises a ported sleeve 145 held in place in the housing part 68 by means of snap rings as shown and mounted on the pedal operated cam shaft 35 is the cam 40 which engages the end of a metering valve 146 which is biased by spring 147 against the cam 40. Said metering valve 146 is provided with an intermediate neck and adjoining conical surface which cooperates with the passage 148 to vary the size thereof according to the position of the cam 40 and metering valve 146. Thus, when the cam 40 is swung in the clockwise direction, as viewed in FIG. 12, the tapered metering portion of the metering valve 146 will gradually restrict the flow of fluid from passage 57 through chamber 56 and through passage 148 into the hot oil gallery 71. The passage 57 just referred to is the same passage 57 that communicates with the chamber 138 at the right-hand end of the spool 134 of the valve 47 in FIG. 11.

The passage 52 from valve 47 and servo pump 54 leads to the chamber 55 upstream of the orifice 149 and therefore fluid flows through the chamber 56 and passage 148 into the hot oil gallery 71 through ports 150 of the sleeve 145 when the metering valve 146 is partly or fully open as shown in FIG. 12. Of course, when the metering valve 146 is only open a slight amount such that the flow area of passage or variable orifice 148 is less than the flow area of the orifice 149, fluid pressure will build up in the chamber 56 and passage 57 which leads to the right-hand end of the spool 134 of the valve 47 in FIG. 11 to thus urge the spool 134 toward the left. This will be described in detail under the heading II. Operation.

The Pumps 45 and 51 and the Regulating Valve 53 Associated With the Latter (FIGS. 2, 5, 8 and 9)

The r.p.m. pump 45 and the servo pump 51 are gear pumps arranged in tandem and driven by a shaft 155 which is coupled to the rotary pump inlet valve drive shaft 99 which, in turn, is coupled to the engine-driven pump drive shaft 65. The shaft 155 is keyed to one of the pair of meshing gears 156 of the pump 45 and to one of the pair of meshing gears 157 of the pump 51.

These pumps 45 and 51 have intake ports 158 and 159 respectively which communicate with the sump 13 and delivery ports 160 and 161 which by way of the previously referred passages 46 and 52, communicate respectively with the valves 47 and 48—49, and the valves 47 and 53, as best shown in FIG. 8.

Figure 9:
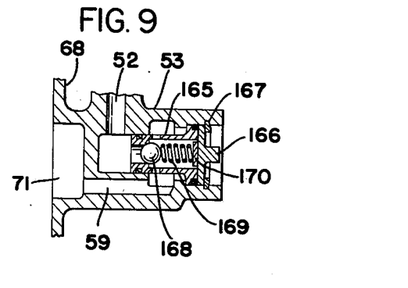

The regulating or relief valve 53 associated with the servo pump 51 is in the nature of a ball relief valve connected in parallel with the pump 51 as clearly shown in FIGS. 2, 8, and 9. The ported sleeve 165 of valve 53 is held in place by the plug 166 and snap ring 167 and has a seat for the ball 168 which is biased by spring 169 to closed position and which is adapted to be unseated to open communication between the delivery passage 52 from pump 51 and the return branch 59 that leads to the hot oil gallery 71 to maintain a prescribed pressure of the fluid delivered by the pump 51. In other words, the ball 168 is in seated position except when the pressure of the fluid delivered by the pump 51 is greater than a predetermined maximum as determined by the bias of the spring 169. Such spring bias may be increased or decreased as desired by substituting spring backup disks 170 of different thicknesses between the spring 169 and the aforesaid plug 166.

The Direction Control Valve 17 (FIGS. 2 to 6)

The body of this valve is formed in the housing part 68 including a bore 175 therethrough intersected axially therealong by a pressure inlet passage 14B; a pair of service passages 20; a return passage 18; and another pair of service passages 19.

Reciprocable in the bore 175 is a valve spool 176 biased to the right as viewed in FIG. 6 by means of the spring 177 that is compressed between the solenoid assembly 25 and the valve spool 176. In this position, which is the forward drive position, fluid under pressure delivered through passages 14A and 14B from the variable capacity, positive displacement pump 10 flows through the service passages 20 to the wheel-mounted fluid motors 15 to drive the wheels 2 to propel the vehicle 1 forwardly. When the solenoid 25 is energized by turning the direction switch lever 28 to the reverse "R" position, the spool 176 will be pulled to the left, as viewed in FIG. 6, thereby closing communication between the inlet and the forward passages 14B and 20 and establishing communication between the inlet passage 14B and the reverse passages 19 by way of the chamber 178 at the left, axial cross-over passage 179 from chamber 178 to the chamber 180 at the right-hand end of the valve 17 to passages 19 whereby the wheel motors 15 and wheels 2 will be driven in the opposite direction to propel the vehicle 1 rearwardly.

When the spool 176 is in the forward position (solenoid 25 deenergized) the fluid displaced by the fluid motors 15 returns through the service passages 19 into the return passage 18 to the sump 13 by way of the open brake valve 21 which is shown in FIGS. 2 and 13, and similarly, when the spool 176 is in the reverse position (solenoid 25 energized) the displaced fluid from the wheel motors 15 flows through the service passages 20 to the return passage 18 and thence to the sump 13 by way of the open brake valve 21.

The ends of the valve bore 175 are closed by plugs 181 and 182 which are retained in place by snap rings or the like.

The Brake Valve 21 (FIGS. 2 and 13)

This valve as described in connection with FIG. 2, is operated by the cam 39 on the cam shaft 35 responsive to movement of the pedal 6 to the "Brake Range." When the pedal 6 is in the "Free-Wheeling Range" and "Power Range," as represented in FIG. 2, the pressure balanced brake valve spool 185, 188 will be biased by spring 186 against cam 39 to assume the position shown in FIG. 13, whereby the return fluid flowing in passage 18 from the wheel motors 15 and from the return passage 18 of the direction control valve 17 will flow through the passages 187 and 187A into the hot oil gallery 71, but as the pedal 6 is swung into the "Brake Range" (cam shaft 35 rotates counterclockwise as viewed in FIG. 13) the spring 186 will cause the brake valve spool 185 to progressively decrease the cross-section size of the passages 187 and 187A thereby restricting the return of fluid from the wheel motors 15 and applying a braking action in proportion to the size of the openings 187 and 187A. When the brake is fully applied, the brake valve spool 185 substantially closes the passage 187 so that full braking effect is exerted on the wheel motors 15 except for slight leakage through the annular gap between the land 188 and the bore 189 of the ported sleeve 190.

It is to be noted that the heating of the fluid due to the braking action is remote from the wheel motors 15, that is, it is at the throttled openings 187 and 187A in the brake valve 21 and as heat is generated, it is promptly dissipated by the heat exchanger 22 which is closely adjacent to the hot oil gallery 71.

The Pilot Operated Relief Valve 24 (FIGS. 2, 3, 4 and 14)

The valve body is formed in the housing part 68 and the valve includes a spring-biased main valve member 195 which closes communication between the pump 10, delivery line 14 (or 14A and 14B) and the return line 18, except when the pressure in the delivery line exceeds a predetermined maximum safe value which, for example, may be in the vicinity of 12,000 p.s.i. In order that such main relief valve member 195 may employ a relatively soft spring 196 and effect a prompt and large opening for such relief of excess pressure, there is provided in tandem therewith a pilot valve assembly 197 which includes a thimble portion 198 having an orifice 199 therethrough and normally closed by the spring-biased pilot valve member 200. The main valve 195 also has an orifice 201 therethrough and when the pilot valve member 200 is in seated position the pressures in the chambers 202 and 203 are equalized through the main valve orifice 201 so that the main valve 195 is held in seated position by the relatively weak spring 196. However, when the pressure in the chamber 203 acting on the small exposed area of the pilot valve 200 exceeds the bias effect of the pilot valve spring 204, the pilot valve 200 is urged to open position to vent the chamber 203 by way of the passage 205 at a rate which is greater than that at which fluid can be replenished through orifice 201 into the chamber 203 from the main valve chamber 202. When this occurs there will be a pressure differential between the chambers 202 and 203 such that the biasing effect of the main valve spring 196 is overcome, whereby the main valve 195 is urged by the predominating pressure in the chamber 202 toward the right, as viewed in FIG. 14, to relieve such excess pressure building up in the delivery system 14A and 14B from the variable capacity pump 10 through passages 206 and 205 into the hot oil gallery 71.

The Free-Wheeling Check Valve 62 (FIGS. 2 to 6)

As best shown in FIGS. 5 and 6, this valve has an inlet port 210 communicating with sump 13, a seat 211, a check valve member 212 urged by spring 213 to closed position (and also by fluid pressure in the pressure inlet passage 14B of the direction control valve), and an outlet port 214 leading to passage 14B. Thus, whenever the wheels 2 are turning faster than the fluid from pump 10 flows into the motors 15, the deficiency is made up by opening of the valve member 212 under the influence of negative pressure in passages 14B and 214 which permits the then predominating pressure of the fluid in the sump 13 to force the valve member 212 away from seat 211. This occurs also when the pedal 6 is moved to the "Free-Wheeling Range" while the vehicle 1 is in motion.

*Throttle Operation (FIGS. 1 and 2)*

Figure 19:
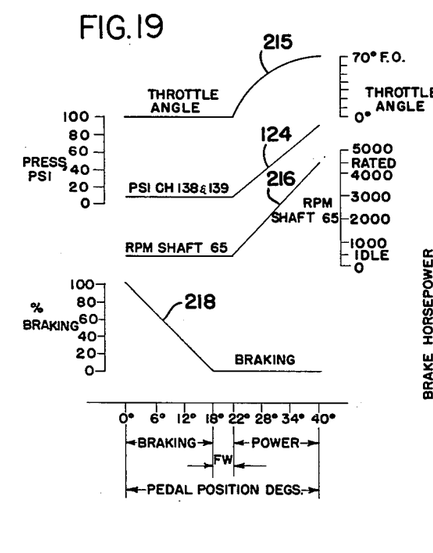
FIGS. 19 to 21 are charts having plotted thereon curves concerning the operating characteristics of the present fluid drive and brake system.

As shown in FIG. 2, the engine throttle valve 38 is linked to a cam member or lever 37 which has a cam groove of configuration as shown to open the throttle in the manner represented by the curve 215 in FIG. 19, which, in conjunction with the other controls, effects a pressure increase in accordance with the curve 124 and and r.p.m. increase in accordance with the curve 216. Also, the braking curve 218 shown in FIG. 19 is preferably a straight line function with percentage of braking power correlated with the degree of movement of the pedal 6. Of course, as already mentioned in connection with FIG. 2, the cam link 37 is actuated by the cam 36 on the cam shaft 35 in accordance with the movement of the operating pedal 6.

II. CHARACTERISTICS OF THE PRESENT DRIVE SYSTEM

Engines or prime movers which create the power they deliver by burning liquid fuel can be obtained to operate on one of many cycles. By far the greatest number of these engines in present day use are of the four cycle, spark-ignition type which employ gasoline as the fuel. The operating efficiency or specific fuel consumption of the four cycle spark ignition engines varies as much as 90% for a given power output, depending on the r.p.m. and load. This is one reason that such an engine is difficult to operate at its most efficient range in a motor vehicle where r.p.m. and load vary over a very wide range and often without a corresponding change in vehicle speed.

This type of engine has been chosen as a source of power in connection with the present invention and, as later described, the principles of the invention may be used in connection with other types of prime movers, such as diesel engines, gas turbines, etc.

Figure 20:
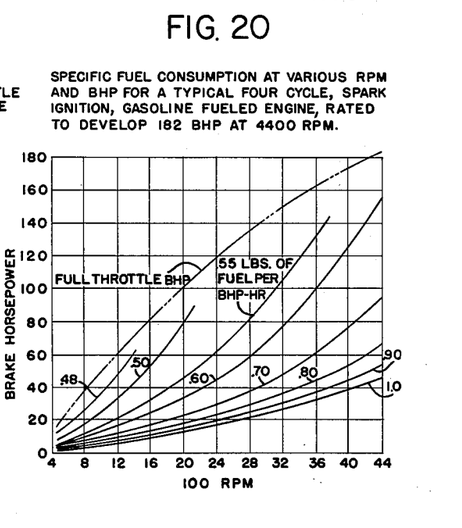

In FIG. 20, there are drawn curves of constant specific fuel consumption for various values of r.p.m., and B.H.P. (brake horsepower) for a typical four cycle, spark-ignition gasoline engine which is produced in large numbers. A general inspection of the curves will reveal that for any selected B.H.P. the engine will operate much more economically at low r.p.m. than at high r.p.m.

A passenger car of average size and weight requires approximately 20 H.P. to maintain a speed of 50 m.p.h. on a hard surfaced level road. Using the engine of FIGS. 20 and 21, and a standard gear box transmission, and standard related drive system (curve C, FIG. 21), the engine would operate at approximately 2400 r.p.m. at 50 m.p.h. and from said FIG. 21 it can be determined that the specific fuel consumption is .9 lb.-B.H.P.-hr. at the 2400 r.p.m. and 20 B.H.P. point. This corresponds to a fuel consumption of about 15.8 m.p.g. By way of comparison when using the present hydraulic drive system, as shown by curve A in FIG. 21, the 20 H.P. required for 50 m.p.h. would be obtained by operating the engine at approximately 900 r.p.m. Under that condition of operation the specific fuel consumption is only about .5 lb.-B.H.P.-hr. at 900 r.p.m. and 20 H.P. which would correspond to a fuel consumption of 28.4 m.p.g. Therefore, the decrease in fuel consumption at 50 m.p.h. through the use of the present invention amounts to a substantial percentage, namely 44.5%.

Figure 21:
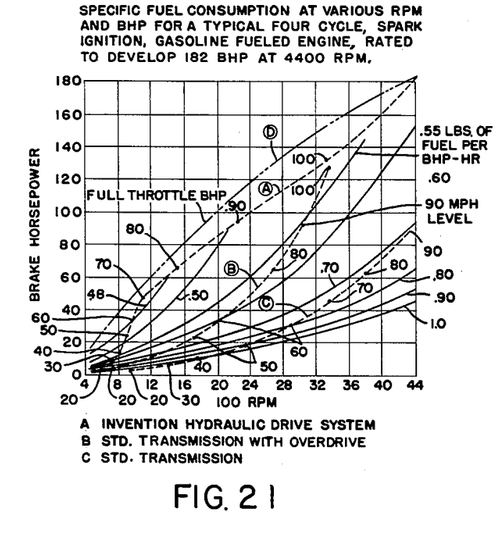

FIG. 21 is a reproduction of FIG. 20, with the lines A, B, and C, added to show the r.p.m. versus B.H.P. relationships for level road operation when using the hydraulic drive of the invention (curve A), a standard transmission with overdrive, (curve B), and a standard transmission (curve C) and from this FIG. 21, it is possible to determine the large reduction in fuel consumption obtainable with the present invention at any vehicle speed.

The curve B, FIG. 21 for the standard transmission with an overdrive approaches the limit in reducing the engine r.p.m. with present drive systems including the torque convertor-turbine-gear family of transmissions. The limit is established for such automatic transmission systems by considering the amount of power that must be made available for accelerating at given vehicle speed. For example, at 40 m.p.h. level road, the curve C of FIG. 21, shows that the engine will have a speed of 1900 r.p.m. and will deliver 14 B.H.P. Should the driver suddenly floor the accelerator, the engine would instantly develop 95 B.H.P. at 1900 r.p.m., as shown by the full throttle B.H.P. curve D. This action of the driver makes 81 B.H.P. (95 minus 14) immediately available for acceleration. Now, consider the acceleration from 40 m.p.h., on curve B, when the engine speed is only 1350 r.p.m. while delivering 14 B.H.P. Under the floored accelerator condition, the engine would develop 68 B.H.P. at 1350 r.p.m. thereby making instantly available only 54 B.H.P. for acceleration compared to 81 B.H.P. when operating on the curve C with the standard transmission. The automotive industry has found that the average driver is not satisfied with acceleration values less than those corresponding to the curve B.

However, with the present invention, which has operating characteristics shown by the line A, at 40 m.p.h. level road traveled the engine is operating at 800 r.p.m. to obtain the 14 B.H.P. required by the vehicle. When the pedal 6 is floored to obtain acceleration, the control sleeves 86 in the variable capacity pump 10 are moved to reduce the amount of fluid delivered per stroke by the plungers 82, this allowing the engine to increase its rotative speed at the rated value. The curve A in FIG. 21 indicates that the B.H.P. will be 182 at 4400 r.p.m. This makes instantly available 168 B.H.P. (182 minus 14) for acceleration.

Accordingly, it is evident that the 168 B.H.P. available with the present invention, compared with 81 B.H.P. and 54 B.H.P. available with the standard transmission (curve C) and the standard transmission with overdrive (curve B), respectively, will give excellent acceleration. Moreover, with the present invention, the 168 B.H.P. will be divided equally at the four wheels 2 so that there is 42 B.H.P. available at each wheel, whereas, with the standard transmissions and related two wheel drive systems, the 81 or 54 B.H.P. is divided by two, namely, 40.5 or 27 B.H.P. at each of only two drive wheels.

In the case of conventional transmissions, engine speed is geared to the vehicle speed to the extent that engine speed increases only as vehicle speed increases except by gear shifting. In contra distinction, with the present invention, the operator can select r.p.m. by positioning the pedal 6 to obtain any desired r.p.m. independently of vehicle speed.

An inspection of FIGS. 20 and 21, indicates that the lowest values of specific fuel consumption lie near the full throttle line D. Since the curve A, is selected primarily to achieve best vehicle operating economy, it will approach the position of the full throttle line whenever possible. However, with an 182 B.H.P. engine, as illustratively used in FIG. 20, more power is developed at full throttle idling r.p.m. than can be used for level road speeds of 50 m.p.h. and less so that it is necessary to operate at part throttle in this range. After a study of all the operating considerations, a program of throttle opening versus engine r.p.m. such as represented by the curves 215 and 216, in FIG. 19 is evolved which will permit operation at the widest open throttle position and lowest r.p.m. possible. This program is transformed into terms of vehicle speed, B.H.P. and r.p.m. and appears as the curve A. of FIG. 21. It is to be noted from said curve A that the engine speed changes from 600 r.p.m. at 20 m.p.h. to 950 r.p.m. at 60 m.p.h. thereby resulting in only a 350 r.p.m. change in changing the vehicle speed from 20 to 60 m.p.h. This is a very small change in comparison with the change of 1420 r.p.m. obtained with the standard transmission, but is ample for achievement of very effective r.p.m. modulation. The cam 40 shown in FIG. 2, together with the valve 54, coordinated through the movement of the pedal 6 makes this possible.

The present invention also makes it possible to design the vehicle with an engine of considerably less power while yet achieving the excellent performance aforesaid, and additionally, embodying full throttle operation with attendant low specific fuel consumption values to a lower vehicle speed. For example, if the curve A, were plotted on coordinates similar to FIG. 20 for an engine rated at 100 B.H.P., 4000 r.p.m. instead of 182 lbs. at 4400 r.p.m., the line or curve A would be very close to the full throttle line for vehicle speeds as low as 30 m.p.h.

Vehicles such as trucks, having to operate with widely varying loads, now employ a great many transmission speed ratios to maintain good cruising speeds in hilly or mountainous country. Employment of the present system for trucks eliminates the need for any gear shifting and will make available the equivalent of a transmission with an infinitely large number of speed ratios. Additionally, a good cruise speed can be maintained regardless of load or operation over hilly roads because any amount of power can be had at any vehicle speed up to the maximum developed by the engine at rated full throttle r.p.m.

III. ALTERNATIVE STRUCTURES

*Positioning of the Valve 54 by Manifold Vacuum Instead of by the Operator's Foot Pedal 6 (FIGS. 23 to 28)*

Figure 23:
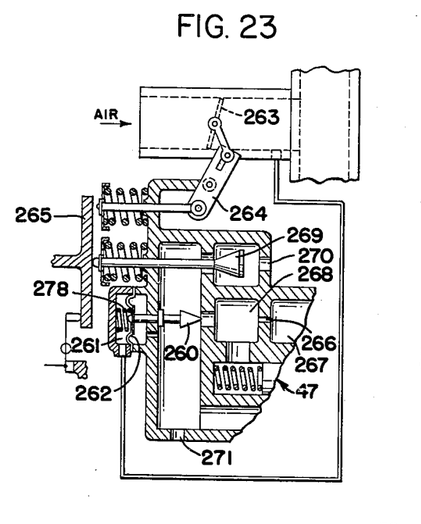
FIG. 23 illustrates a further modification wherein manifold vacuum is employed to provide certain control characteristics.

As shown in FIG. 23, the structure is basically the same as FIGS. 2–5, with the exception that the valve 260 is positioned by manifold vacuum applied in the chamber 261 against a spring-biased diaphragm 262 and that the throttle valve 263 is positioned by direct mechanical linkage 264 with the operator's foot pedal through the pedal operated member 265, there being no need for the cam 40 shown in FIGS. 2 and 12. The orifice 266, and chambers 267 and 268 correspond respectively with orifice 149 and chambers 55 and 56 shown in FIGS. 2 and 12.

In FIG. 23, the brake valve 269 is operated by member 265 which is linked to the operator's pedal in such manner that when member 265 moves to the left, the fluid from the direction control valve 17 connected with port 270 is constricted as it flows past valve 269 to the sump port 271.

Figure 24:
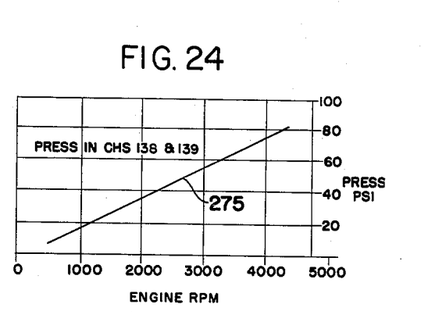
Figure 25:
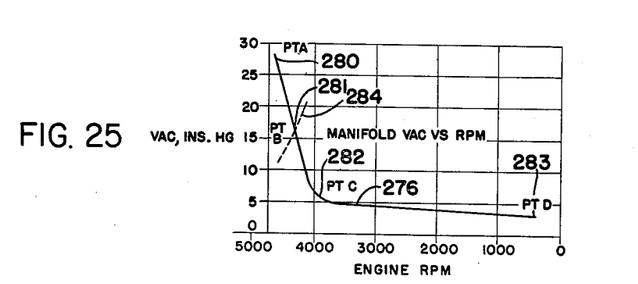
Figure 26:
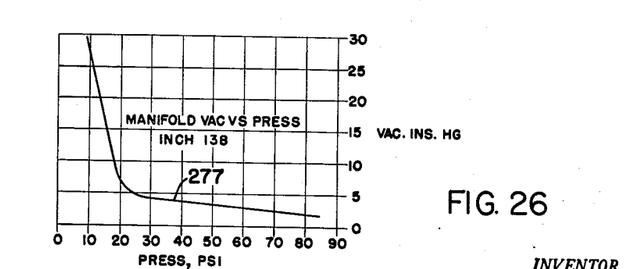

The curve 275 in FIG. 24 shows the desired relationship between engine r.p.m. and the servo pressure in the chambers at the ends of the valve 47. This relationship is obtained by cross-plotting data lines 124 and 216 in the power range from FIG. 19. The curve 276 in FIG. 25 shows the relationship between engine r.p.m. and manifold vacuum in order to obtain operation along the line A of FIG. 21. The curve 277 in FIG. 26, is a cross-plot of the curves 275 and 276, and shows the relationship desired for manifold vacuum versus control pressure in the chamber 268 (chamber 56 in FIG. 2). This relationship is obtained through proper selection of the following variables as indicated on FIG. 23, viz, the area of the diaphragm 262, the rate and load of the spring 278, the size of the orifice 266, and the contour of the valve 260 and the size of the valve seat.

To illustrate the operation of the system employing manifold vacuum, as in FIG. 23, it will be assumed that the engine used is the same as in FIGS. 20 and 21, and that operation is scheduled along the line A of FIG. 21. Referring to FIG. 25, the point 280 corresponds to zero throttle valve opening, the point 281 corresponds to approximately 50% throttle valve opening, the point 282 corresponds approximately to 95% throttle valve opening and the point 283 corresponds to 100% throttle valve opening, the curve 284 illustrating the relationship of manifold vacuum versus engine r.p.m. for a constant throttle opening of approximately 50%. Curves similar to curve 284 may be plotted for other throttle valve openings. Assuming steady operation at point 281, the 50% throttle valve opening to be at 50 m.p.h. on level road under this condition, the pressures in the chambers of valve 47 are equal and the valve therein is centered. Assuming that the vehicle starts up a hill, but that the operator does not change the position of the pedal 6, as the vehicle starts up the hill the extra load imposed thereby will cause the engine r.p.m. and manifold vacuum to decrease along the constant throttle line together with a reduction in vehicle speed. The decrease in r.p.m. reduces the pressure in the chamber 55 of valve 47 in accordance with the curve 275 while the reduction in manifold vacuum increases the pressure in the chamber 268 in accordance with the curve 277. These pressure changes cause the valve 47 to move to the right in FIG. 23 and thereby reduce the capacity and power of the engine driven pump 10. This allows the engine to increase r.p.m. and manifold vacuum along the curve 284 until the pressures are again equalized at the point 281 on curve 276. At this time, the vehicle speed will be less than 50 m.p.h. by an amount proportional to the grade of the hill.

On the other hand, if the operator wants to maintain a speed of 50 m.p.h. while climbing the hill, all that he would have had to do was to depress the pedal 6 and thereby open the throttle valve 263 a sufficient amount to obtain the extra power required. By way of example, it is assumed that the throttle valve opening giving the manifold vacuum at point 282 would have been correct and that the throttle 263 is now opened to this point. Concurrently, with the opening of the throttle from point 281 to point 282 the manifold vacuum decreases to the value shown at point 282. The lower vacuum permits the spring 278 to urge the diaphragm 262 to the right and thereby results in the valve 260 moving in a direction to decrease the flow through its seat thereby raising the pressure in the chamber 268 in accordance with the curve 277. Thus, momentarily the pressure in the chamber 268 is greater than in the other chamber 55 and the valve 47 is moved to the right and reduces the capacity and power of the engine driven pump 10. This allows the engine r.p.m. to increase thereby concurrently increasing the pressure in the chamber 55 and when the engine r.p.m. has increased to the value corresponding to point 282 the pressure in chamber 55 will have increased to an amount which equals the pressure in the chamber 268 and the valve 47 again will be centered. Under this new condition of pressure balance, the power delivered by the engine will be greater by an amount proportional to the decrease in manifold vacuum and the increases in r.p.m. This increase in power is that which was required to maintain the vehicle speed at 50 m.p.h. while climbing the hill.

Power for acceleration is obtained in a similar manner and it can be seen that by flooring the foot pedal 6, the engine power associated with full throttle and rated r.p.m. is instantly available for acceleration at any vehicle speed thereby providing more power for acceleration than is attainable with any known transmission system in use.

*Alternate Use of a Mechanical Centrifugal Governor in Place of the Pump 45 and Related Valve 48—49 (FIG. 22)*

Figure 22:
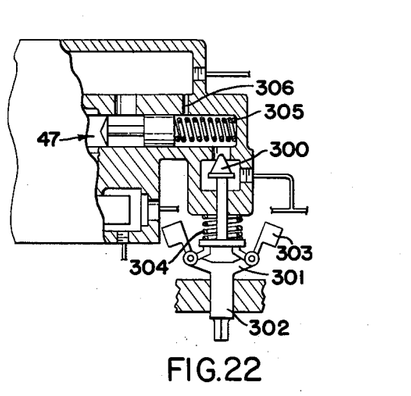
FIG. 22 is a fragmentary section of a modification in which is employed a mechanical-centrifugal governor.

The structure shown in FIG. 22 is substantially the same in basic principles with that shown in FIG. 2 except that the valve 300 replaces the valve 49—49 of FIG. 2; servo fluid is used from pump 51 and, therefore, the other pump 45 is not required; that the valve 300 is operated by a centrifugal governor 301; and that a drive means is required for the governor shaft 302 which will rotate at the same r.p.m. as the drive shaft of the engine or the drive shaft 65 of the hydraulic drive assembly 5.

The governor 301 is designed to furnish the r.p.m. versus pressure characteristic as established by the lines 124 and 216 of FIG. 19. This is the same performance furnished by the pump 45 and the valve system 48—49 which it can replace as an alternate. Therefore, its operation with the overall system can be considered essentially the same.

An increase in the speed of the governor shaft 302 causes the governor weights 303 to move radially outwardly thereby compressing the spring 304 and moving the valve 300 toward its seat. This action increases the resistance to flow through the valve seat and consequently, raises the pressure in chamber 305. To achieve the desired r.p.m. versus pressure characteristics, proper selection of the variables such as size of orifice 306, rate and load of spring 304, contour of valve 300 and size of its seat, and the mass and leverage of governor weights 303 must be taken into consideration.

Figure 27:
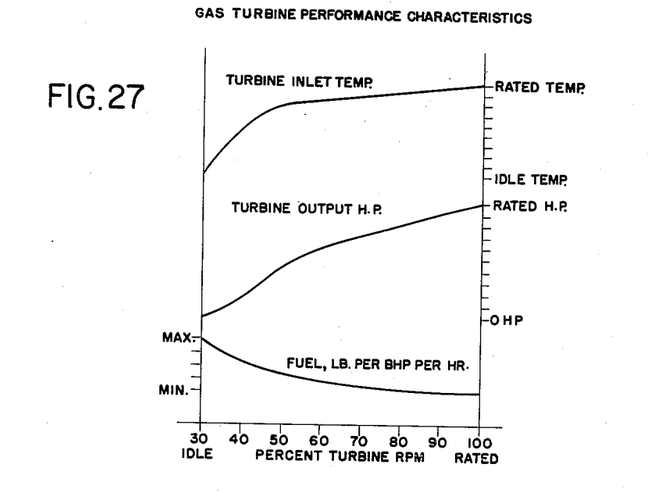
FIG. 27 is a chart relating to gas turbine performance characteristics.
Figure 28:
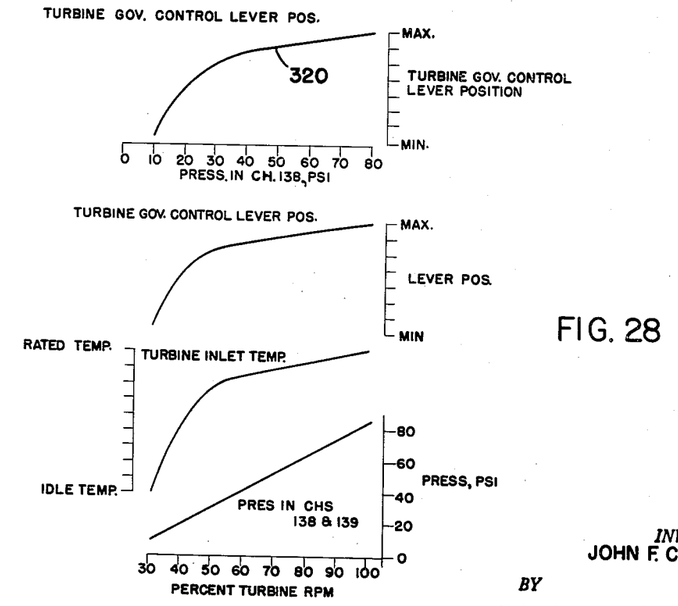
FIG. 28 is a plotting of the control elements of a gas turbine as used in conjunction with the present fluid drive and braking system.

IV. GAS TURBINE APPLICATION (FIGS. 27 AND 28)

The gas turbine is universally thought of as being a substantially constant r.p.m. power source. However, for motor vehicle applications where the power required varies from zero at idling speed, to several hundred horsepower at maximum speed, it is necessary to operate the turbine through a range of from approximately 30 to 100% of its rated r.p.m. It is also necessary to reduce the turbine inlet temperature in addition to the r.p.m. in order to obtain delivery of the small amount of power used at low vehicle speeds. Recent developments have established that the employment of an exhaust regenerator is a big help in keeping the turbine efficiency from dropping off excessively under conditions of low turbine r.p.m. and low inlet temperature. Although the development of gas turbines for motor vehicle use is yet in its infancy, at the present time a great many parameters of its operation have been established.

For any given arrangement of gas turbine components it is possible to choose a relationship of temperature and r.p.m. to achieve the lowest practical fuel consumption for each value of horsepower. At 20 m.p.h. approximately 4 h.p. is required to propel a modern passenger car on a level road. Knowing that, the designer may choose a turbine inlet temperature and r.p.m. to produce the lowest fuel consumption. This is repeated at other values of horsepower until temperature and r.p.m. values are established for the entire power range. FIG. 27 illustrates the expected temperature versus r.p.m. relationships evolved from the above-referred to procedure. However, present day transmissions will not furnish this sort of relationship, and therefore, acceleration would be very feeble indeed.

The present invention can be efficiently operated with a gas turbine while furnishing excellent acceleration. Following are simple modifications which need to be made in the construction to prepare it for use with a gas turbine instead of the four cycle, spark-ignition gasoline engine:

(1) Couple the gas turbine output shaft to the pump drive shaft 65;

(2) Considering the throttle link 37 (FIG. 2) to represent the gas turbine fuel and temperature governor control lever instead of the carburetor throttle valve lever, it will be seen that the angular position of this lever 37 bears a relationship to turbine inlet temperature as represented in FIG. 28. Thus, one can select the orifice size, seat size, and valve contour to achieve the relationship of turbine governor temperature position versus the pressure in the chamber 56 corresponding to the curve 320 in FIG. 28.

V. DIESEL ENGINE APPLICATION

In the case of diesel engine application, no change is required in the FIGS. 1–5 construction, except that the lever 37 becomes the fuel control instead of the air control. A schedule of pressure in the chamber would then be related to r.p.m. as is associated with fuel flow instead of related to throttle valve position and air flow. The operation of the system with a diesel engine as the prime mover is the same as described for the four cycle, spark-ignition gasoline engine previously discussed in detail.

Other modes of applying the principle of the invention may be employed, change being made as regards the details described, provided the features stated in any of the following claims, or the equivalent of such, be employed.

I therefore particularly point out and distinctly claim as my invention:

1. In a power transmission system, the combination of an engine; control means for varying the speed and power output of said engine; a variable capacity pump having a delivery port driven by said engine; a fluid motor operatively connected with the delivery port of said pump; fluid pressure pump capacity varying means directly operatively associated with said control means and effective to vary the pump capacity from minimum when there is a large difference between the actual speed and power output of said engine and the desired increased speed and power output as selected by said control means to maximum when the actual speed and power output of said engine conforms with that selected by said control means, said pump capacity varying means comprising a variable fluid pressure source, a pressure-actuated member in said pump moved to different positions responsive to different pressures from said source to decrease and increase pump capacity as required, said source including a dual-chamber valve so arranged that increase of pressure in one chamber moves said valve to decrease pressure to said member, and increase of pressure in the other chamber moves said valve to increase pressure to said member.

2. The power transmission system of claim 1 wherein said fluid motor is provided with a return line for conducting spent fluid therefrom to a sump; fluid motor brake means operable to restrict flow of fluid to said sump thereby to decrease the speed of said motor.

3. The power transmission system of claim 1 wherein a reversing valve is operatively connected between said pump and fluid motor to effect driving of the latter in either direction.

4. The power transmission system of claim 1 wherein said engine is of the spark-ignition, internal combustion type; and said control means includes a manually operated throttle valve on said engine.

5. The power transmission system of claim 1 wherein said fluid motor is provided with a return line for conducting spent fluid therefrom to a sump; fluid motor brake means operable to restrict flow of fluid to said sump thereby to decrease the speed of said motor; and a manually operated member effective selectively to actuate said control means and brake means.

6. The power transmission system of claim 1 wherein said fluid motor is provided with a return line for conducting spent fluid therefrom to a sump; fluid motor brake means operable to restrict flow of fluid to said sump thereby to decrease the speed of said motor; and a manually operated member effective selectively to actuate said control means and brake means; free-wheeling means permitting coasting of said motor when said control means is operated to decrease the speed and power output of said engine, said free-wheeling means comprising a check valve through which fluid flows from said sump to said fluid motor when the displacement of the latter is greater than the displacement of said pump.

7. The power transmission system of claim 1 wherein said one chamber is disposed between a first orifice and a second variable orifice, the latter being decreased in flow area in accordance with the setting of said control means to a value such that pressure builds up in said one chamber in relation to the pressure in said other chamber.

8. The power transmission system of claim 7 wherein pressure builds up in said other chamber as the speed and power output of said engine is comparable with the setting of said control means.

9. In a power transmission system, the combination of a prime mover and an associated control means to vary the speed and power output of said prime mover; a variable capacity pump driven by said prime mover; a fluid motor to which fluid under pressure is delivered by said pump; a fluid-pressure actuated member effective to vary the capacity of said pump in accordance with the magnitude of fluid pressure acting thereon; and a fluid pressure system effective to supply different fluid pressures to said member, said system including a first valve, an engine driven servo pump to supply fluid under pressure to said member via said valve, valve operating means effective through movement of said valve first to decrease the capacity of said variable capacity pump when said control means is moved to a position demanding an engine speed and power output greater than the actual speed and power output and then to increase the capacity of said variable capacity pump as the actual speed and power output approaches the demanded speed and power output, said first valve being movable to one position to communicate such pressure source with said member and to another position to bleed fluid pressure that acts on said member; said valve operating means comprising variable restrictions which build up pressures acting on said valve to move it to such positions according to the relationships of the demanded and actual speeds and outputs.

10. The power transmission system of claim 9 wherein said fluid motor is provided with a return line leading to a sump; and brake means constituting a variable restriction in said return line operable to restrict a varying degree the return flow of fluid from said fluid motor thereby to impose braking effect thereon.

11. The power transmission system of claim 10 wherein a second valve is operated as a consequence of operating said brake means to decrease the capacity of said variable capacity pump to a minimum.

12. The power transmission system of claim 11 wherein said control means is shifted to decreased engine speed and power output position as a consequence of operating said brake means.

References Cited in the file of this patent

UNITED STATES PATENTS

| | | |
|---|---|---|
| 1,615,341 | Murray | Jan. 25, 1927 |
| 1,922,539 | Groff | Aug. 15, 1933 |
| 2,260,414 | Thaheld | Oct. 28, 1941 |
| 2,275,321 | Scates | Mar. 3, 1942 |
| 2,293,693 | Wylie et al. | Aug. 18, 1942 |
| 2,532,605 | Castleberry | Dec. 5, 1950 |
| 2,547,578 | Holmes | Apr. 3, 1951 |
| 2,634,681 | Rowell | Apr. 14, 1953 |
| 2,642,805 | Nepper | June 23, 1953 |
| 2,646,755 | Joy | July 28, 1953 |
| 2,650,573 | Hickman | Sept. 1, 1953 |
| 2,680,412 | Entwistle | June 8, 1954 |
| 2,694,288 | Nubling | Nov. 16, 1954 |
| 2,858,163 | Nagel | Oct. 28, 1958 |
| 2,886,944 | Horwood | May 19, 1959 |
| 2,902,826 | Littell et al. | Sept. 8, 1959 |
| 2,904,957 | Quayle | Sept. 22, 1959 |

FOREIGN PATENTS

| | | |
|---|---|---|
| 578,985 | Germany | June 19, 1933 |